United States Patent Office

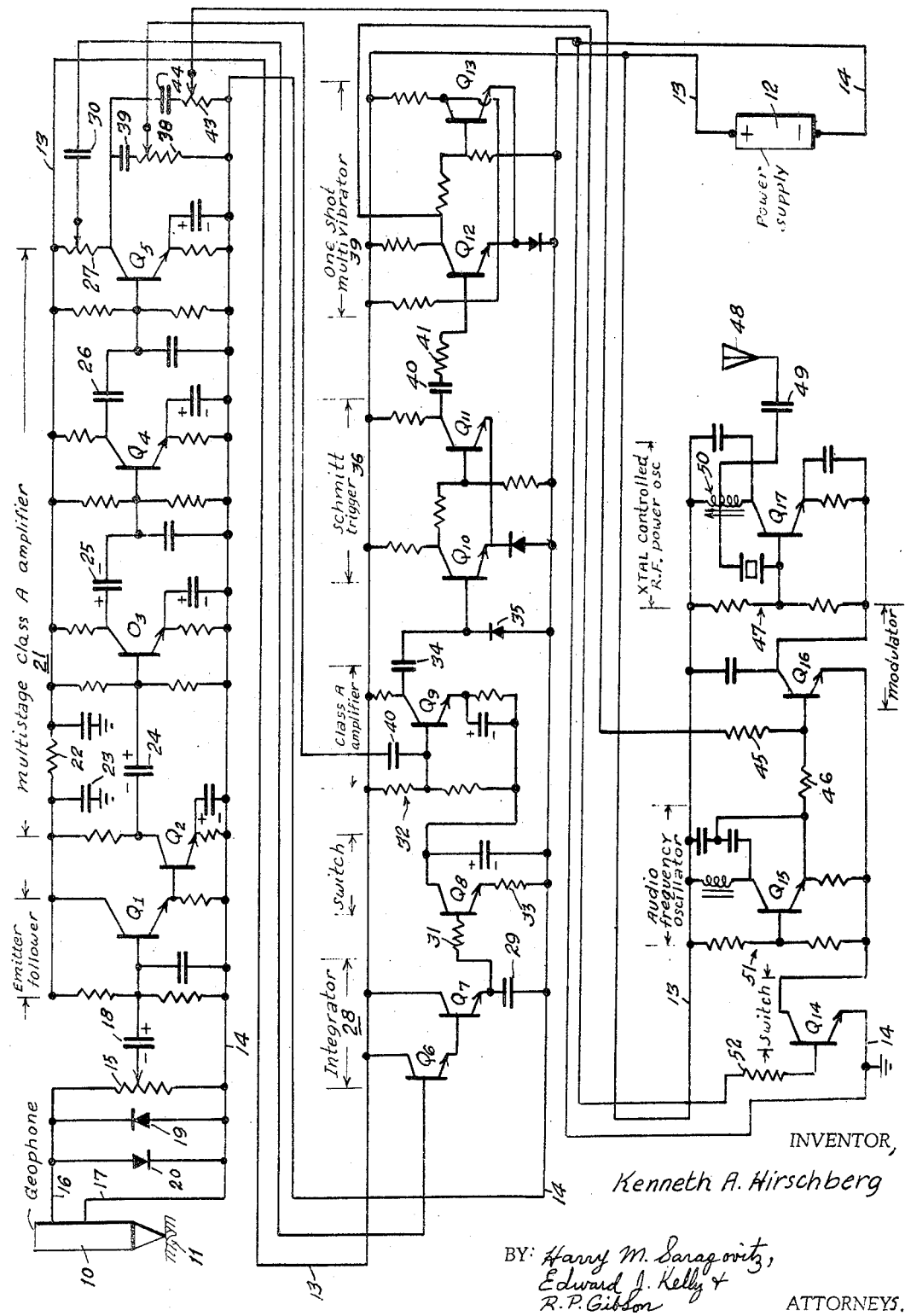

3,480,942
Patented Nov. 25, 1969

3,480,942
TRANSMITTING SEISMIC SENSOR SYSTEM
Kenneth A. Hirschberg, Saratoga, Calif., assignor, by mesne assignments, to the United States of America as represented by the Secretary of the Army
Filed Aug. 2, 1968, Ser. No. 749,643
Int. Cl. G08b 21/00
U.S. Cl. 340—261                         5 Claims

ABSTRACT OF THE DISCLOSURE

A wireless seismic ambush aid consisting of a low power telemetry set for the purpose of both transmitting and converting into recognizable form information from a seismometer which is received by a remotely located radio frequency receiver.

---

The invention relates to apparatus for detecting movement of troops or equipment in areas of dense forest or open country and more particularly to unmanned transmitting seismic sensor systems which may be placed in strategic locations in the aforementioned areas whereby acoustic waves transmitted through the earth due to movements of troops on equipment are detected and transmitted to radio frequency receiving stations.

Accordingly a prime object of the invention is a wireless seismic ambush aid.

Another object of the invention is a low power telemetry set for the transmission of seismic signals wherein the basic sensor is a geophone.

Another object of the invention is a low power telemetry set for the transmission of seismic signals interpretable in real time with commonly used radio receivers.

A still further object of the invention is a wireless geophone wherein is retained at least some of the basic, normally inaudible, geophone signal in order to enhance target recognition.

The invention will be more fully understood and its objects and advantages further appreciated by referring now to the detailed description taken in conjunction with the accompanying drawing.

Referring now to the sole figure in the drawing which is a schematic diagram exemplifying the transmitting seismic sensor system of the invention comprising a low power telemetering set for the purpose of both transmitting and converting into recognizable form information from a seismometer and wherein 10 indicates a seismometer or geophone which is commonly a moving coil transducer in contact with the surface of earth 11 for the detection of acoustic waves generated therein by troop or equipment movement in the vicinity of geophone 10.

A power supply 12 is directly coupled across the various units of the wireless geophone by means of conductor 13 and conductor 14, comprising the common circuit, with the exception of class A transistor amplifier $Q_9$, audio frequency oscillator or tone generator $Q_{15}$, modulator $Q_{16}$ and the crystal controlled transistor radio frequency power oscillator $Q_{17}$ units each of which have one power input directly connected to conductor 13 and another power input coupled to the common circuit 14 through transistor switching means as subsequently described. The seismic signal voltage generated by geophone 10 in response to the aforementioned acoustic waves is applied across gain control potentiometer 15 by means of conductors 16 and 17. The resistance element of potentiometer 15 is connected across the output of geophone 10 and the rotating arm thereof coupled to the base electrode of emitter follower $Q_1$ through capacitor 18 whereby the seismic signal is applied thereto. A pair of back to back connected diodes 19 and 20 are connected across the resistance element of potentiometer 15 to protect the emitter follower $Q_1$ from overvoltage. The output of emitter follower $Q_1$ is direct coupled to the base electrode of class A common emitter amplifier $Q_2$ of multistage class A amplifier 21. The emitter follower $Q_1$ and common emitter amplifier $Q_2$ are isolated from power supply 12 by means of voltage dropping resistor 22 connected between conductor 13 and emitter follower $Q_1$ and common emitter amplifier $Q_2$ in conjunction with filter capacitor 23 connected between the low voltage side of resistor 22 and common circuit 14. The multistage class A amplifier 21 consists of common emitter amplifiers $Q_2$, $Q_3$, $Q_4$ and $Q_5$ having their outputs and inputs coupled to each other by means of capacitors 24, 25 and 26, respectively.

The amplified seismic signal appearing at the output of common emitter amplifier $Q_5$ across integrator level control potentiometer 27 connected between the collector electrode of common emitter amplifier $Q_5$ and conductor 13 is coupled to the base electrode of transistor $Q_6$ of integrator 28 by means of capacitor 30 which couples said base electrode with the rotating arm of potentiometer 27. The integrator 28 consists of transistors $Q_6$ and $Q_7$ and a capacitor 29 which is connected between the emitter electrode of transistor $Q_7$ and conductor 14. The emitter electrode of transistor $Q_6$ is directly coupled to the base electrode of transistor $Q_7$ and collector electrodes of these transistors are connected to conductor 13. The junction formed by capacitor 29 and emitter electrode of transistor $Q_7$ is coupled to the base electrode of transistor switch $Q_8$ through resistor 31. Capacitor 29 charges up and turns on transistor switch $Q_8$ after a sufficient number and amplitude of disturbance have been detected. The collector electrode of transistor switch $Q_8$ is coupled to biasing network 32 of class A common emitter amplifier $Q_9$ and the emitter electrode thereof through emitter resistor 33 to common circuit 14 whereby amplifier $Q_9$ is enabled, that is, coupled to the common circuit 14 when transistor switch $Q_8$ is turned on by integrator 28.

The amplified seismic signal at the output of common emitter amplifier $Q_5$ is also coupled to a trigger level control potentiometer 38 by means of capacitor 39 in series with one terminal of trigger level control potentiometer 38 and the collector electrode of common emitter amplifier $Q_5$. Another terminal of trigger level control potentiometer 38 is returned to common circuit 14 and the rotating arm thereof is capacitively coupled to the base electrode of amplifier $Q_9$ by means of capacitor 40 whereby the level of the amplified seismic signal applied thereto is controlled. The output of amplifier $Q_9$ is taken at the collector electrode thereof which is capacitively coupled by means of capacitor 34 to the base electrode of transistor $Q_{10}$ of Schmitt trigger 36, comprising transistors $Q_{10}$ and $Q_{11}$, whereby the Schmitt trigger 36 is activated and applies a triggering pulse to one-shot multivibrator 39 through series connected capacitor 40 and resistor 41 which couple the collector electrode of transistor $Q_{11}$ with the base electrode of transistor $Q_{12}$. Diode 35 connected between the base electrode of transistor $Q_{10}$ and common circuit 14 clamps the output seismic signal of amplifier $Q_9$ above ground.

A modulation level control potentiometer 43 has one terminal connected to common circuit 14 and another terminal connected through capacitor 44 to the collector electrode of common emitter amplifier $Q_5$ whereby the amplified seismic signal is applied thereacross. Resistor 45 couples the base electrode of modulator $Q_{16}$ and the rotating arm of potentiometer 43 whereby the amplified seismic signal is applied to said base electrode and at which point it amplitude modulates the two KC signal generated by audio frequency oscillator $Q_{15}$ the output of which is coupled to said base electrode by means of resistor 46. The collector electrode of modulator $Q_{16}$ is directly coupled to the biasing network 47 of crystal controlled R.F. power oscillator $Q_{17}$ whereby the amplitude modulated tone signal is applied to and modulates the radio frequency signal generated by oscillator $Q_{17}$, resulting in a modulated output signal containing the seismic signals which is coupled to antenna 48 by means of capacitor 49 connecting antenna 48 with collector circuit 50 of oscillator $Q_{17}$.

As described above, the one-shot multivibrator 39 is activated by the pulse from Schmitt trigger 36. The output of one-shot multivibrator 39 is coupled to the base electrode of transistor switch $Q_{14}$ by means of resistor 52 connecting the collector electrode of transistor $Q_{12}$ with the base electrode of transistor switch $Q_{14}$ which has its emitter electrode connected to common circuit 14 and its collector electrode connected to biasing network 51 of audio frequency oscillator $Q_{15}$ and to the emitter electrode of modulator $Q_{15}$ whereby during the one-shot cycle (5 seconds) of one-shot multivibrator 39, transistor switch $Q_{14}$ turns on audio frequency oscillator $Q_{15}$, modulator $Q_{16}$ and crystal controlled R.F. power oscillator $Q_{17}$ through modulator $Q_{16}$, that is, transistor switch $Q_{14}$ couples these units to common circuit 14 whereby power is coupled thereto.

The signal from the above described transmitting seismic sensor system when received on an AM receiver is a tone which comes on for a five second period during which the normally inaudible seismic signals are heard in the tone. Tone sensitive circuitry in the receiver identifies the particular unit in the case where there are more than two or three. However, a small number can be monitored by ear wherein there is involved but a simple low and high tone.

Although a specific embodiment of the invention has been illustrated and described, it will be understood that this is but illustrative and that various modifications may be made therein without departing from the spirit of the invention and the scope of the appended claims, for example, the generated tone signal may be frequency modulated instead of amplitude modulated, or the use of another frequency conversion technique may be employed, or none at all producing but a beep at the footstep rate.

I claim:

1. A transmitting seismic sensor system for the purpose of both transmitting and converting into recognizable form information from a geophone in response to acoustic waves in the earth which may be generated therein by passage of individuals or vehicles in the vicinity of the geophone comprising in combination, a D.C. power supply coupled to said system for energizing said system, a geophone located in strategic position on the surface of the earth to detect acoustic waves transmitted therethrough, an amplifier coupled to the geophone for producing amplified seismic signals at the output thereof, a continuous wave radio frequency transmitter, an antenna coupled to the output of said radio frequency transmitter, an amplitude modulator adapted to apply amplitude modulating signals on the radio frequency carrier of said radio frequency transmitter, an audio frequency tone generator coupled to the input of said amplitude modulator whereby a tone signal is applied thereto, electrical conductors coupling said amplified seismic signals to the input of said amplitude modulator whereby said tone signal is amplitude modulated, said amplitude modulator impressing the amplitude modulated tone signal on the radio frequency carrier of said radio frequency transmitter resulting in a modulated signal containing the normally inaudible seismic signals being radiated by said antenna when said tone generator, amplitude modulator and radio frequency generator are activated, and an electronic switching device having an input coupled to the output of said amplifier and an output adapted to couple units comprising said tone generator, amplitude modulator and radio frequency transmitter across said power supply in response to the seismic signal output of said amplifier applied to the input of said switching device to activate said units whereby a modulated signal containing the normally inaudible seismic signals are radiated by said antenna during the period of detection of said acoustic waves.

2. A transmitting seismic sensor system for the purpose of both transmitting and converting into recognizable form information from a geophone in response to acoustic waves in the earth which may be generated therein by passage of individuals or vehicles in the vicinity of the geophone comprising in combination, a D.C. power supply coupled to the system for energizing said system, a geophone located in strategic position on the surface of the earth to detect acoustic waves transmitted therethrough, a multistage transistor amplifier for producing amplified seismic signals at the output thereof representative of said acoustic waves, a transmitter emitter-follower coupling said geophone to said multistage transistor amplifier providing impedance matching therebetween, a pair of diodes connected in opposite conducting directions to each other across the geophone for preventing excessive voltage from the geophone being applied to said emitter-follower, an integrator having the input thereof coupled to the output of the multistage transistor amplifier through an integrator level control coupled between the output of said multistage amplifier and the input of said integrator for controlling the level of the seismic signals thereby applied to the input of the integrator, a transistor class A amplifier having the input thereof coupled through a trigger level control to the output of said multistage amplifier for controlling the level of said amplified seismic signals thereby applied to the input of said class A amplifier, a first transistor switch having an input coupled to and responsive to the output of said integrator and an output coupled between said class A amplifier and said power supply whereby when said first transistor switch is activated by the output of said integrator the class A amplifier is conductively coupled across said power supply and thereby enabled producing an amplified signal at the output thereof of the seismic signal applied to the input thereof, a one-shot multivibrator, a Schmitt trigger coupled between the output of said class A amplifier and the input of the one-shot multivibrator responsive to the output of the class A amplifier to trigger the one-shot multivibrator whereby a control signal of duration of the time period of the one-shot multivibrator is produced at the output thereof, a continous wave radio frequency transmitter having an antenna coupled to the output thereof, an amplitude modulator having the output thereof in series with said radio frequency transmitter adapted to apply amplitude modulating signals on the radio frequency carrier of said radio frequency transmitter, an audio frequency tone generator coupled to the input of said amplitude modulator whereby a tone signal is applied thereto, a modulation level control coupled between the output of said multistage amplifier and the input of said amplitude modulator for limiting the level of the amplified seismic signals thereby applied to the input of the amplitude modulator whereby said tone signal is modulated, and a second transistor switch having an input coupled to and responsive to said control signal to enable the output thereof coupled between said power supply and units comprising said tone generator, amplitude modulator and radio frequency generator whereby said units are conductively coupled across said power supply and activated whereupon said tone signal is applied to the input of said amplitude modulator and modulated at the last mentioned input by said seismic signals, said amplitude modulator impressing upon the carrier of said radio frequency transmitter the seismic signal modulated tone signal whereupon a modulated signal containing the normally inaudible seismic signals are radiated by said antenna during the time period of said one-shot multivibrator while said sonic waves are being detected.

3. The invention in accordance with claim 2 wherein the output stage of said multistage amplifier comprises a common-emitter amplifier employing a transistor having base, emitter and collector elements, and wherein said integrator level control comprises a first potentiometer provided with a rotating arm, the resistance element of said first potentiometer connected between said collector element and the positive pole of said power supply, said emitter element connected through a resistor to the negative pole of said power supply, and a capacitor coupling said rotating arm with the input of said integrator whereby seismic signals developed across said resistance element are applied to said integrator.

4. The invention in accordance with claim 3 wherein said trigger level control comprises a second potentiometer provided with a rotating arm, the resistance element of said first potentiometer capacitively coupled between said collector element and said negative pole, and said rotating arm capacitively coupled to the input of said class A amplifier whereby the seismic signals developed across said resistance element are coupled to said class A amplifier.

5. The invention in accordance with claim 4 wherein said modulation level control comprises a third potentiometer provided with a rotating arm, the resistance element of said third potentiometer capacitively coupled between said collective element and said negative pole, and said rotating arm directly coupled to the input of the amplitude modulator whereby the seismic signals developed across said resistance element are directly applied to the input of the amplitude modulator.

References Cited

UNITED STATES PATENTS 3,192,516    6/1965    Simpkins et al.
3,261,009    7/1966    Stetten et al. _____ 340—261

RODNEY D. BENNETT, Jr., Primary Examiner

CHARLES E. WANDS, Assistant Examiner

U.S. Cl. X.R.

340—15